Nov. 16, 1965 C. C. SMITH ETAL 3,218,531

LOCAL AND REMOTE CONTROL SYSTEM FOR MOTOR CONTROLLED EQUIPMENT

Filed June 6, 1962

INVENTORS
CARLETON C. SMITH
JOHN J. POZORSKI
BY
Andrus & Starke
Attorneys 3,218,531
Patented Nov. 16, 1965

3,218,531

LOCAL AND REMOTE CONTROL SYSTEM FOR MOTOR CONTROLLED EQUIPMENT

Carleton C. Smith, Menomonee Falls, Wis., and John J. Pozorski, Fort Lewis, Wash., assignors to Johnson Service Company, Milwaukee, Wis., a corporation of Wisconsin Filed June 6, 1962, Ser. No. 200,442
19 Claims. (Cl. 318—17)

Figures 1, 2:
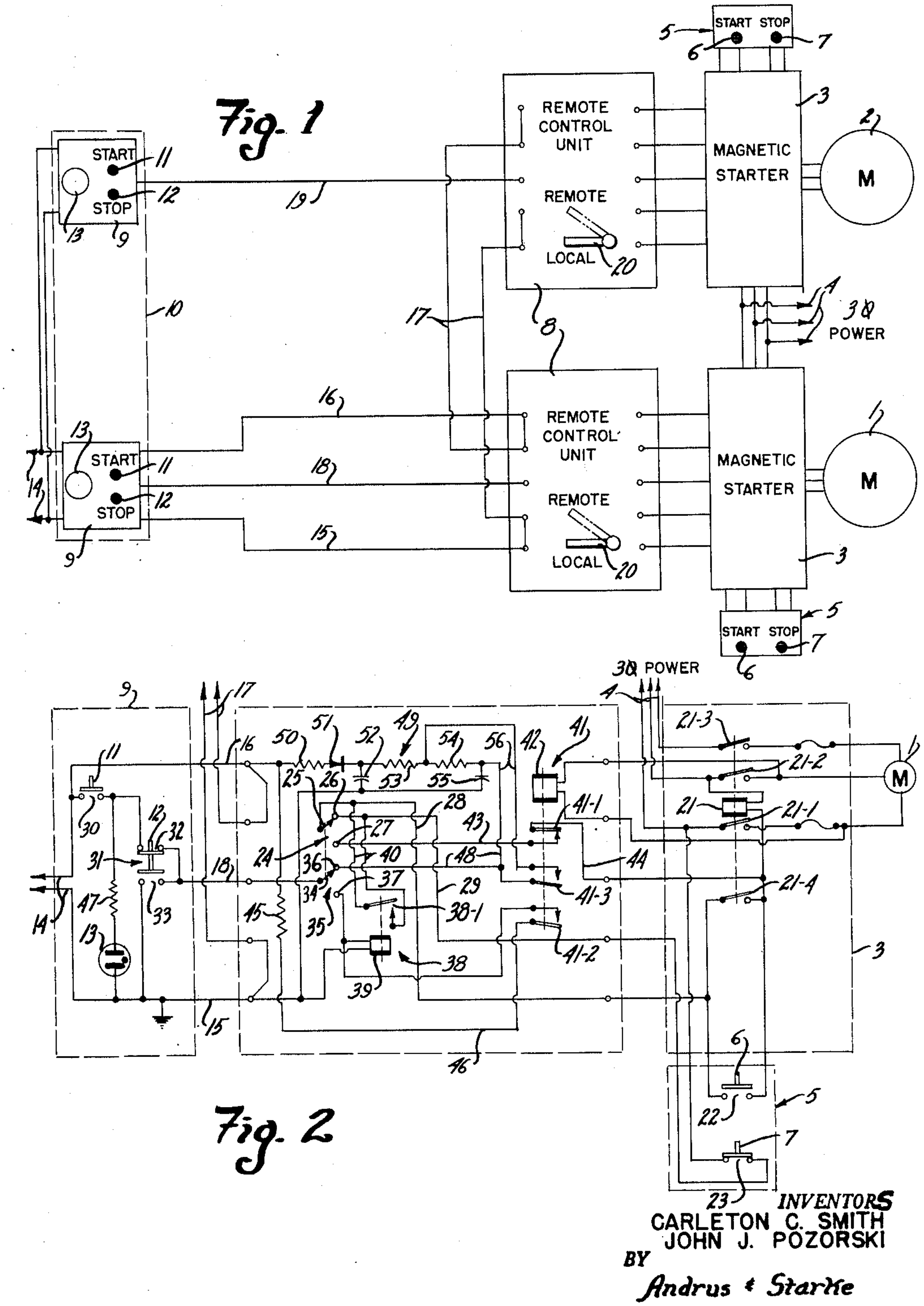

This invention relates to a control system for controlled equipment and particularly to a control system having means for selectively disconnecting the remote control and having means for continuously indicating the operating status of the equipment and the location of the control.

The operation of various devices often requires remote control from a control center as well as local control in the immediate vicinity of the devices. For example, a number of electric motors may be operating in various locations and a common control center provided from which the several motors can be started and stopped at the will of personnel at the center. In addition, separate local starting and stopping control is normally provided in proximity to each of the motors to allow maintenance and servicing personnel and the like to control the equipment directly for purposes of safety and convenience. In certain control systems, both the remote and local control portions should be constructed to prevent restarting of the corresponding device if there is a loss of power either in the control or the main power system of the equipment.

Although combined remote and local systems are known, they generally employ completely separate wiring circuits between the control center and the several devices. This results in relatively expensive initial and maintenance costs particularly where an indicating system is provided at the control center to indicate the operating status of the equipment.

The present invention is particularly directed to a local and remote control system which may incorporate all of the above special features and be connected with the conventional starter equipment by a very minimum number of control wires or leads between a control center and a plurality of remotely controlled pieces of equipment. The present invention while employing a minimum number of control wires or leads provides a continuous indication at the control center of both the location of the control and the operating status of the controlled equipment.

In accordance with the preferred construction of the present invention, maximum safety is maintained by providing means in the proximity of the equipment to completely disconnect the remote control center and by interconnecting the remote control circuit with the local stop circuit such that the equipment may be conveniently stopped at the local station at all times.

The present invention also preferably includes means preventing automatic restarting of the device after loss of control power or main power to the equipment.

In accordance with the present invention, the control center is connected to each controlled equipment by separate control-signal leads and by common control power leads which may be made common to any number of pieces of equipment by use of jumper leads between the controlled equipment. Remote control units are provided one each at the location of each piece of controlled equipment and interconnect the control-signal lead and the power leads to a local control circuit. The control signal from the control center is transmitted over the several control-signal leads to actuate the corresponding equipment.

Each control-signal lead also interconnects an indicating means to an operating source at the remote control unit with the output of the source dependent on the operating status of the controlled equipment and the setting for remote or local control.

A particularly simple circuit for indicating the control site and operating status of the equipment includes a neon lamp at the control center interconnected through the control-signal lead to a power source at the controlled equipment which feeds back a signal to operate the lamp. With the equipment off and control at the remote station, the lamp is off. When the equipment is in operation and under the control of the remote station, a signal is fed to the neon lamp which burns continuously. If local control is established, an intermittent signal is applied to the neon lamp which flashes on and off. The period of the intermittent signal is controlled by the operating status of the controlled equipment such that the lamp flashes at one rate when the equipment is energized and another different rate when the equipment is de-energized for example.

The individual control-signal leads interconnect suitable switch control means at the control center to the controlled equipment through a circuit which is conjointly dependent on the maintenance of the main power to the load and the control power to the control circuit. This prevents automatic restarting as the result of a loss and then a return of power.

The present invention thus provides a relatively simple and inexpensive control system for remote control of equipment and is particularly adapted to the remote control of a plurality of pieces of equipment with a minimum field wiring and with continuous monitoring of the control and operation status.

The drawing furnished herewith illustrates the best mode presently contemplated for carrying out the invention.

In the drawing:

FIG. 1 is a block diagram of a remote and local control system for indicating and controlling the operation of a pair of motors; and FIG. 2 is a schematic circuit diagram of a portion of the circuit of FIG. 1 showing the interconnection of a remote control center and a local control center for motors.

Referring to the drawing and particularly to FIG. 1, a pair of motors 1 and 2 is shown as the controlled devices. The illustrated motors 1 and 2 are of a three phase construction and are individually connected by suitable magnetic starters 3 to incoming three phase main power lines 4. Generally, motors 1 and 2 are similarly controlled and corresponding elements in the respective circuits are similarly numbered for simplicity and clarity of explanation. Local start-stop centers 5 are mounted in close proximity to each of the corresponding motors 1 and 2. Each local center 5 includes a start button 6 and a stop button 7 for energizing the magnetic starter 3 and selectively starting and stopping the corresponding motors 1 and 2. Individual remote control units 8 are also mounted at the local start-stop centers 5 and are interconnected to the magnetic starters 3 with the start and stop buttons 6 and 7 for remote control of the motors 1 and 2. An individual remote start-stop center 9 for each motor 1 and 2 is provided at a main control center or panel 10 which is normally widely separated from motors 1 and 2. Each remote center 9 includes a start button 11 and a stop button 12 for remotely controlling the starting and the stopping of the corresponding motors 1 and 2. A neon lamp 13 is mounted immediately adjacent the buttons 11 and 12 and, as hereinafter described, provides a visual indication of the position of control and the operating status of the corresponding motor 1 or 2.

Incoming control power lines 14 of a suitable voltage are connected to each center 9 at the control panel 10. One of the remote centers 9, shown as that associated with motor 1, is connected by a pair of control power leads 15 and 16 to the remote control unit 8. Leads 15 and 16, as more clearly shown in FIG. 2, are connected directly as extensions of the control power lines 14. Lead 15 is a common ground and lead 16 is a common hot lead. Branch leads 17 are connected between the control units 8 for supplying control power to the remote control unit 8 for motor 2. Individual and separate control-signal leads 18 and 19 extend one each from the remote start-stop centers 9 to the corresponding remote control units 8. Leads 18 and 19 are interconnected to the control power lines 14 by the start button 11 and the stop button 12 for transmitting control signals over the respective leads and effecting remote control of the motors 1 and 2.

A local-remote switch lever 20 is mounted on each of the control units 8 and selectively connects the leads 18 and 19 for local or remote control of the motors 1 and 2. As more fully described hereinafter, an indicating signal is fed back over the respective leads 18 and 19 to the centers 9 and operates the lamps 13 to indicate the operating condition of the motors 1 and 2 and the presence of local or remote control.

The field wiring consisting of the leads 15, 16, 18 and 19 for the remote control of motors 1 and 2 thus requires two common control power leads 15 and 16 and the individual control-signal leads 18 and 19. Additional motors or other equipment, not shown, can be added by the addition of the remote control centers 9 and units 8 interconnected by a single field lead for each piece of equipment. The present system thus provides complete remote control and monitoring of the remote equipment while requiring only two common leads and one additional lead for each piece of individually controlled equipment.

The remote control centers 9 and the remote control units 8 for motors 1 and 2 are similarly constructed and the circuit for motor 1 is hereinafter described in detail and shown in FIG. 2. The control elements shown by labeled blocks in FIG. 1 for motor 2 would be similarly constructed and interconnected.

Referring particularly to FIG. 2, the magnetic starter 3 is schematically shown as a relay unit having a starter winding 21 controlling three sets of normally open contacts 21–1, 21–2 and 21–3, connected one each in each of the three main power lines 4. Motor 1 is energized only when winding 21 is energized and the contacts 21–1, 21–2 and 21–3 are closed.

Starter winding 21 is connected in a series energizing circuit to a pair of the three phase power lines 4 by push button switches 22 and 23 operated by start button 6 and the stop button 7 at the local start-stop center 5. Start switch 22 is normally open and stop switch 23 is normally closed and each of the switches 22 and 23 is momentarily held in the opposite or actuated position by pressing on the start button 6 and the stop button 7. Switches 22 and 23 are interconnected in an energizing circuit for the winding 21 with a local-remote switch 24 of the remote control unit 8.

The local-remote switch 24 is a single-pole, double-throw switch having a switch arm 25 coupled to and operated by the switch lever 20 shown in FIG. 1. The arm 25 is selectively positioned in engagement with a local contact 26 establishing a local switching position and with a remote contact 27 establishing a remote switching position.

The starter winding 21 is interconnected in the local control circuit through the remote control unit 8 as follows. One side of winding 21 is connected directly to one of the three phase power lines 4, shown as the intermediate line in FIG. 2. The opposite side of the winding 21 is connected to one side of the normally open start switch 22. A lead 28 connects the opposite side of switch 22 to the switch arm 25 of the local-remote switch 24. In the position of switch 24 for local control, arm 25 engages contact 26 which is connected by a lead 29 to one side of the normally closed stop switch 23. The opposite side of the latter switch 23 is connected directly to a different one of the lines 4 from that first described as being connected to winding 21. This then describes a single phase series circuit connected across two of the three main power lines 4 and normally interrupted only at start switch 22. When the start button 6 is pressed and switch 22 is held closed, the circuit to relay winding 21 is completed and current flow therethrough results in the closing of the starter contacts 21–1, 21–2 and 21–3. The power circuit to the motor 1 is then completed.

The starter winding 21 additionally is electromagnetically coupled to control a set of latching contacts 21–4 which are connected across or in parallel with the normally open start switch 22. Momentary closing of the switch 22 and the resultant energization of the winding 21 closes the contacts 21–4 and thereby maintains a similar circuit to the winding 21 with the latched contacts 21–4 for the start switch 22 until opening of the stop switch 23 or the local-remote switch 24.

With the switch lever 20 and therefore local-remote switch 24 disposed in the local switch position, the motor 1 is started and stopped by momentary operation of the start switch 22 or stop switch 23 through momentary depressing of the associated buttons 6 and 7 at the local start-stop center 5.

To establish remote control, the local-remote switch 24 is placed in the remote switching position by moving of the switch lever 20 such that arm 25 moves into engagement with the remote contact 27. The remote circuit is connected through the control lead 18 to the start button 11 and the stop button 12 of the remote start-stop center 9 at the central control panel 10.

The circuit of the start-stop center includes a push button start switch 30 actuated by the start button 11 and a push button stop switch 31 actuated by the stop button 12. The stop switch 31 is a double-pole unit and includes two sets of contacts 32 and 33. The contacts 32 are normally closed and are connected in series with the switch 30 between the hot lead 16 and the control-signal lead 18 within the center 9. The opposite end of the control-signal lead 18 is connected to a switch arm 34 of a local-remote switch 35 which is mounted within the remote control unit 8 in proximity to the motor 1 and coupled to the switch lever 20.

As shown by the dashed coupling line, switch arms 25 and 34 of the respective local-remote switches 24 and 35 are ganged and are interconnected to the single switch lever 20 shown in FIG. 1 for simultaneous and similar positioning.

Switch 35 includes a local contact 36 and a remote contact 37 for respectively connecting the lead 18 in circuit for local and remote control. Contact 36, as hereinafter described, connects the lead 18 to a feedback signal source for indicating the operating status of the motor 1 under the local control which was previously described. The remote contact 37 connects the control-signal lead 18 to a trigger relay 38 for motor 1 and in a feedback signal circuit for indicating the operating status of the motor 1 and the fact that the remote control connection is established.

Trigger relay 38 includes a relay winding 39 having one side connected to the remote contact 37 and the opposite side connected to the common ground lead 15. When push button 11 is depressed at the remote center 9, the start switch 30 is closed and the circuit to the winding 39 is completed across the control power leads 15 and 16.

A set of normally open relay contacts 38–1 is electromagnetically coupled to the winding 39 and closed in response to energization thereof. The relay contacts 38–1 are connected in series with the remote switching position of the local-remote switch 24 by leads 40 which are connected to the leads 28 and 29 to switch arm 25 and the local contact 26, respectively.

An interlock relay 41 includes a set of normally closed contacts 41–1 electromagnetically coupled to a relay winding 42 and connected to the remote contact 27 of the local-remote switch 24 by a lead 43. A lead 44 connects the opposite side of the contacts 41–1 to the side of the starter winding 21 connected to the local station start switch 22.

In the remote position of the local-remote switches 24 and 25, the starting circuit for the starter winding 21 is traced as follows: beginning with the intermediate power line 4 to the starter winding 21, lead 44 and interlock relay contacts 41–1, lead 43, the remote contact 27 and associated contact arm 25 and then to one side of the trigger relay contacts 38–1 through the one lead 40 and back to the local contact lead 29 of the local-remote switch 24 by the opposite lead 40, and from the lead 29 to the stop switch 23 at the local center 5 and to the incoming three phase power line 4 connected to the opposite side of winding 21. Thus, in the remote positioning of the switches 24 and 35, the energization of the starter winding 21 and the resulting operation of the motor 1 is dependent on the closing of the relay contacts 38–1 of the trigger relay 38 which in turn is controlled by the start switch 30 and associated start button 11 of the remote center 9 at control panel 10.

As previously described, the start button switch 11 is only momentarily actuated to the closed position and effects only a correspondingly timed energization of the relay winding 39.

In accordance with the illustrated embodiment of the invention, a set of latching contacts 41–2 of interlock relay 41 is electromagnetically coupled to the relay winding 42 and connected in circuit to maintain energization of relay winding 39 following energization of motor 1. One side of the latching contacts 41–2 is connected to the same side of the trigger relay winding 39 as the control-signal lead 18 which in the initial starting of motor 1 supplies power to the relay 38. The opposite side of the contacts 41–2 is connected to the control lead 16 in series with a resistor 45 by a lead 46. When the contacts 41–2 close, the lead 16 supplies power to the one side of relay winding 39 which has the opposite side permanently connected to the ground lead 15.

Relay winding 42 of interlock relay 41 is connected directly to two of the three phase power lines 4 on the motor side of the contacts 21–1 and 21–2. Consequently, the relay 41 is energized whenever the starter contacts 21–1 and 21–2 close and power is supplied to the motor 1. The relay 38 is then latched to the control power leads 15 and 16 via the relay contacts 41–2.

Energization of relay winding 42 also opens the contacts 41–1 and breaks the initial energizing circuit previously described for starter winding 21.

However, the latching contacts 21–4 are closed by the initial energization of the starter winding 21 and maintain the latter independently energized through the following circuit.

Beginning with the intermediately located power line 4 in FIG. 2, the circuit is traced through starter winding 21, the latching contacts 21–4, lead 28 and the one lead 40 through contacts 38–1 and the opposite lead 40 to lead 29 which is connected to the stop switch 23 at the local center 5, and from the switch 23 to the other line 4; completing the closed energizing circuit for winding 21.

This circuit is maintained, in the absence of a power loss, until either the stop switch 23 at the local center 5 is manually opened or the relay 38 is de-energized, in the manner to be presently described, by manually operating of the stop switch 31 at remote center 9.

The push button stop switch 31 at the control panel 10 includes the second set of normally open contacts 33 connected for remotely effecting the stopping of the motor 1. The normally open contacts 33 are connected respectively to the ground lead 15 at the control center 9 and to the control-signal lead 18. When it is desired to stop the motor 1, the stop button 12 is actuated to close the normally open contacts 33 and establish a short circuit across the trigger relay winding 39 which extends from ground lead 15 to which one side of relay winding 39 is also connected, through the now closed contacts 33 and the control-signal lead 18 to the local-remote switch 35, which in the remote position, connects the lead 18 to the side of the relay winding 39 opposite from the ground side. The current from the hot lead 16 and interlock relay contacts 41–2 is shunted around the relay winding 39 and the relay 38 is de-energized. The contacts 38–1 then open and break the previously described energizing circuit.

The resistor 45 is in the short circuit established by closing of contacts 33 and prevents establishment of a direct shunt circuit across the control leads 15 and 16.

In the illustrated embodiment of the invention, if there is a power failure in the incoming control power lines 14, the relay winding 39 is de-energized and the motor circuit opens. The power subsequently returning will not automatically restart the motor 1 which must be positively restarted through actuation of the remote start switch 11. However, it is to be noted that the remote control energizing circuit does include the push button stop switch 23 at the local center 5 and the motor 1 may at all times be stopped locally.

The interlock relay 41 is energized through the main contactor contacts 21–1 and 21–2. Consequently, any time that the motor 1 is de-energized by the opening of these associated contacts, such as would arise with power line failure, the relay winding 42 is de-energized and remains de-energized until such time as the contacts are again closed as heretofore described. The latching contacts 41–2 open and de-energize the relay winding 39 preventing automatic re-energization of the starter winding 21 and closing of the contacts 21–1 and 21–2. As a result, if a power failure occurs in the three phase power lines 4, the motor 1 does not automatically restart but must be again restarted through actuation of the remote or local start switches, depending upon the position of the local-remote switches 24 and 35.

The ganged local-remote switches 24 and 35 independently establish remote or local control and in the position of local control completely and fully disconnect the remote control center 9. Service and maintenance personnel can therefore operate on the equipment with complete assurance that it will not be accidentally started or the power circuits completed through accidental or mistaken operation at the central control panel 10.

The present invention further provides a continuous signaling system or monitoring system at the corresponding center 9 of control panel 10 for each of the motors 1 and 2. As previously noted, the neon lamps 13 constitute the indicating means and are selectively energized by power fed back from the remote control units 8 over the control-signal leads 18 and 19.

Referring particularly to FIG. 2, the lamp 13 is connected in series with a ballast resistor 47 between the common ground lead 15 and the control-signal lead side of the push button start switch 30. The neon lamp 13 is in circuit with the control-signal lead 18 through the normally closed contacts 32 of the push button stop switch 31. With the local-remote switch 35 in the remote switching position, the lamp 13 is connected in parallel with the trigger relay winding 39. The voltage across the relay winding 39 is sufficient to energize the neon lamp 13 and establish a steady and continuous illumination or flow. A steady glow therefore indicates that the winding 39 is energized and as a result that the motor 1 is operating. It further indicates that the local-remote switch 35 is in the remote switching position and that control of motor 1 is provided at the control panel 10. If the lamp 13 is not illuminated there is no voltage across the winding 39 and the indication is that there is remote control and that power is disconnected from the motor 1.

Placing of the local-remote switch 35 in the local switching position interconnects the control-signal lead 18 with the local contact 36 which is connected by a lead 48 to the output side of a lamp energizing circuit 49 housed within remote control unit 8 and constituting a special current feedback current source. Circuit 49, as more fully described hereinafter, is adapted to energize the lamp 13 to flash rapidly or slowly depending upon the operating status of the motor 1. Flashing of the lamp 13 therefore indicates that the motor 1 is completely under local control at center 5 and that there is no control at the remote center 9.

The energizing circuit 49 includes a surge limiting resistor 50 connected to the hot common lead 16 from the panel 10. A diode 51 and a capacitor 52 are connected in series between the resistor 50 and the grounded control power lead 15. The diode 51 and the capacitor 52 rectify the alternating current and provide a suitable rectified or direct current for operation of a relaxation oscillator circuit.

The relaxation oscillator circuit includes a pair of resistors 53 and 54 connected in series with each other and with a capacitor 55 across the capacitor 52. The lead 48 is connected between the resistor 54 and the capacitor 55 and connects the circuit to the control-signal lead 18 through the local-remote switch 35 in the local switching position thereof. The resistors 53 and 54 and capacitor 55 in combination with the ballast resistor 47 and neon lamp 13 constitute a completed relaxation oscillator circuit. A rectified voltage appears across the capacitor 52 and charges the capacitor 55 through the resistors 53 and 54. The charge across the capacitor 55 is connected across the series circuit of the lamp 13 and the ballast resistor 47. When the voltage is at a sufficient level to fire lamp 13, the lamp 13 flashes on and immediately discharges the capacitor 55 to a voltage level insufficient to maintain operation of the lamp 13, which then goes out. The capacitor 55 is again charged by the rectified voltage across capacitor 52 and the cycle repeats. The surge limiting resistor 50 limits the surge current through the diode 51 and capacitor 52 after capacitor 52 is completely discharged.

The flashing period or rate of the lamp 13 is determined by the time constant of the circuit including the resistance of resistors 47, 53, 54 and the capacitance of capacitor 55 as well as any additional capacitance established between the control-signal lead 18 and the common ground lead 15. Generally capacitor 55 is made sufficiently large such that any lead capacity is minimal and will not noticeably affect the operation of the circuit.

The combination of the capacitances and the resistances is selected such that a relatively slow flashing rate of the neon lamp 13 is established by the circuit thus described and is related to the off condition of the motor 1.

A third set of normally open contacts 41–3 is electromagnetically coupled to the interlock relay winding 42 of interlock relay 41. Contacts 41–3 are connected in parallel with the resistor 54 of the lamp energizing circuit 49 by a pair of leads 56. The relay winding 42, as previously described, is connected to the three phase power lines 4 on to the motor side of the contacts 21–1 and 21–2 and is energized whenever power is supplied to the motor 1. The contacts 41–3 therefore are closed whenever motor 1 is energized and shunt or bypass the current around the resistor 54. The elimination of the resistance of resistor 54 reduces the time constant of the circuit and causes a more rapid charging and discharging of the capacitor 55 with a consequent increase in the flashing rate of the lamp 13. The rapid flashing of the lamp 13 therefore indicates that the motor 1 is operating under local control.

In summary, the flashing of the lamp 13 indicates that switches 24 and 35 are in the local position and that the remote control center 9 is operably disconnected and cannot effect the operation of the motor 1. A rapid flashing indicates that the motor 1 is on and a slow flashing indicates that the motor 1 is off.

The operation of the illustrated embodiment of the invention is briefly summarized as follows.

The remote control units 8 are interconnected with the control centers 5 and the magnetic starters 3, as previously described. The remote control centers 9 provided at the remote control panel 10 are connected to units 8 by the field wiring consisting of the common power leads 15 and 16 and the jumper leads 17 and the individual control-signal leads 18 and 19.

Under normal operations, the switch lever 20 will be placed in the remote position. The motors 1 and 2 will then be under the control of the start buttons 11 and stop buttons 12 at the respective control centers 9. The stop buttons 7 of the local control centers are also maintained in the circuit in the remote switching position to allow immediate stopping in the vicinity of the motors 1 and 2, if necessary.

If there is a power failure of the main three phase power lines 4 or the incoming control power lines 14, the relay windings 21 of the magnetic starters 3 are deenergized and positively disconnect the motors 1 and 2 from the power lines 4. The start button 11 must be positively actuated to re-energize or again start the respective motors 1 and 2.

For motor servicing, maintenance and the like, the switch lever 20 is placed in the local position. This moves the contact arm 34 from the remote contact 37 of switch 35 and positively and completely disconnects the control for the corresponding motor 1 or 2 at the remote control center 9. Motor operation control is then restricted to the start button 6 and stop button 7 at the local control center 5.

The neon lamp 13 provides a continuous indication of the location of the control as well as the operating status of the corresponding motors 1 and 2. In the remote control condition, lamp 13 is on when the motor is operating and off when the motor is not operating. In the local control position, lamp 13 flashes rapidly if the motor is operating and slowly if the motor is not operating.

Although particularly described in connection with the stopping and starting of electric motors, other equipment can be similarly remotely controlled. Forms of control other than starting and stopping can be provided. Although not specially illustrated, the present invention is also readily adapted to various sequential controls. For example, programmed starting and stopping of a number of motors from a single remote control unit can be provided by suitable interconnection between the local starting circuits. Similarly, the various components shown in the preferred construction of the invention can be varied within the scope of the following claims.

The present invention thus provides a very simple and improved remote control system which is particularly adapted to providing continuous monitoring of the remotely located equipment and which requires a very minimum field wiring system. The interlock of the main control and the remote control provides maximum safety in operation and servicing.

Various modes of carrying out the invention are contemplated as being within the scope of the following claims particularly pointing out and distinctly claiming the subject matter which is regarded as the invention.

We claim:

1. In a control system for electro-responsive means located in spaced relation to a remote control center and having a local control center, (a) a control-signal lead interconnected between the remote control center and the local control center for transmission of a control signal for operation of said electroresponsive means,
(b) indicating means at the remote control center connected to said control-signal lead,
(c) location-control means at said local control center to selectively connect the electroresponsive means for remote control and for local control, and
(d) feedback signal means provided at the local control center and having a first position and a second position and selectively connected by the location-control means to the control-signal lead to energize said indicating means in one manner in accordance with the status of the electroresponsive means when in said first position and the setting of said location-control means and the status of the electroresponsive means.

2. The control system of claim 1 wherein said feedback signal means includes,
(a) a first feedback source connected to said control-signal lead with said location-control means set for remote control and establishing a status-signal to the indicating means when the electroresponsive means is energized, and
(b) a second feedback source connected to said control-signal lead with said location-control means set for local control and establishing status signals different from the first named status signal to said indicating means, said last named status signals changing with the actuation of the electroresponsive means.

3. In a control system for electroresponsive means located in remote relation to a remote control center and having a local control center,
(a) a control-signal lead interconnected between the remote control center and the local control center for transmission of a control signal for operation of said electroresponsive means,
(b) electrically actuated signal means at the remote control center connected to said control-signal lead,
(c) location control means at said local control center to selectively connect the electroresponsive means for remote control and for local control,
(d) a first feedback signal means at the local control center and connected to the control-signal lead with the location control means establishing remote control and arranged to constantly energize said indicating means during operation of the electroresponsive means, and
(e) a second feedback signal means at the local control center and connected to the control-signal lead with the location control means establishing local control and generating a first intermittent signal with said electroresponsive means in a first operational status and a second intermittent signal with said electroresponsive means in a second operational status for effecting corresponding intermittent operation of the indicating means.

4. The control system of claim 3 wherein,
(a) said signal means includes a gas-filled lamp,
(b) said second feedback signal means comprises a relaxation oscillator circuit having an output connected to said control-signal lead, and
(c) means to vary the time constant of the oscillator circuit in accordance with the operational status of the electroresponsive means.

5. A remote control system for a plurality of electrically actuated devices, which comprises,
(a) a remote control station having individual remote control centers for each device and having control power lines connected to each center,
(b) local control centers having electrically actuated circuit altering means for actuating said devices in the vicinity of the corresponding device and common input control power means connected to each other,
(c) input circuit altering means at each of said remote and local control centers,
(d) a single set of control power leads from said remote control station interconnected to said common input control power leads,
(e) a plurality of individual and separate single conductor control-signal leads each connecting the input circuit altering means for one of said remote control centers to a corresponding electrically actuated circuit altering means, and
(f) means at the local control centers connecting the corresponding input circuit altering means with the electrically actuated circuit altering means and including means controlled by the control-signal lead.

6. The remote control system of claim 5 having,
(a) location control circuit altering means connecting each electrically actuated circuit altering means to the control-signal leads for separately establishing a local control connection and a remote control connection to the associated device.

7. The remote control system of claim 6 wherein,
(a) said local control connection completely removes control from the remote center and said remote control connection establishes complete remote control and partial local control.

8. The remote control system of claim 6 for devices which are started and stopped from the local and remote control centers, wherein
(a) each of said remote control connections includes means at the local control center permitting stopping of the controlled device.

9. A control system for individually controlling a plurality of devices from a remote control panel having separate control means for each device, which comprises,
(a) a plurality of remote control units disposed one each adjacent each of the devices and responsive to an electrical signal for controlling the corresponding device,
(b) common control power leads for connection to a source of control power and connected between said control panel and one of said remote control units,
(c) means to interconnect the other remote control units to the one of said remote control units to transfer control power from the one connected to the common control power leads to the others, and
(d) an individual control lead, one for each control unit connected between a corresponding control means at the remote control panel and said corresponding remote control unit for transmitting a separately controlled electrical signal from the control panel for each device.

10. The construction of claim 9 having,
(a) means adjacent the devices for local control thereof,
(b) an indicating means at the control center connected to the corresponding individual control lead, and
(c) means at each remote control unit connected in circuit with said individual control lead for transmitting a signal to the indicating means in accordance with the operation of the corresponding device and the location of the control of the device.

11. The construction of claim 9 having,
(a) local control means adjacent each device for local control thereof,
(b) circuit switching means at the remote control units to selectively condition said local control means for sole control of the corresponding device,
(c) separate indicating means located at the control panel for each of the plurality of devices and connected to the corresponding individual control lead, and
(d) a feedback signal source means at each remote control unit connected in circuit with said individual control lead for transmitting a signal to the indicating means in accordance with the operation of the corresponding device and the location of the control of the device.

12. A control system for individually controlling a plurality of devices from a remote control center having separate control means for each device, which comprises, (a) a plurality of remote control units disposed one each adjacent each of the devices and responsive to a predetermined electrical signal for controlling the corresponding device,
(b) common control power leads for connection to a source of control power at the control center and connected between said control center and one of said remote control units,
(c) means to interconnect the remote control units to transfer control power to all of the remote control units,
(d) individual control-signal leads connected between corresponding control means at the control center and said remote control units,
(e) indicating means connnected to the control-signal leads for each of said devices, and
(f) means at each of said remote control units to transmit a signal to the indicating means in accordance with the status of the corresponding device.

13. A control system for individually controlling a plurality of devices having a remote control station having separate control means for each device which comprises, (a) a plurality of remote control units disposed one each adjacent each of the devices and having a trigger means and responsive to a predetermined electrical signal for controlling the corresponding device,
(b) common control leads for connection to a source of control power and connected between said control station and one of said remote control units,
(c) means to interconnect the remote control units to transfer control power from the one connected to the common control leads to the others,
(d) individual control leads connected between corresponding control means at the control center and said remote control units,
(e) local control centers for each device mounted in proximity thereto and having an interlocking switch means,
(f) local-remote switch means at each of said remote control units to selectively connect the control lead for remote control of the trigger means and to disconnect the control lead to positively prevent remote control, and
(g) second local-remote switch means in said remote control unit actuated with said first local-remote switch means and having a local switching position establishing a circuit between the local control center and the devices and having a remote switching position establishing a circuit between the trigger means and the interlocking switch means of the local control center to establish a remote control and limited local control.

14. A remote and local control system for electrically actuated means having power contacts connecting the means to main power lines, (a) means for closing said contacts,
(b) a local switching center for actuating said means,
(c) a first local-remote switch having a local switching position and a remote switching position, said local-remote switch in said first switching position connecting the local switching center to said means,
(d) a remote control center having a pair of control power leads for connection to a source of incoming power and a control-signal lead connected by switch means to a first of said power leads and by second switch means to a second of said power leads,
(e) an electroresponsive trigger means having contact means connected in circuit with said local-remote switch,
(f) a second local-remote switch having a remote switching position connecting the electroresponsive trigger means in series circuit with said control-signal lead and one of said control power leads and having a local switching position,
(g) an electroresponsive interlock connected to the main power lines for energization in response to the closing of the power contacts and having contact means connected in an energizing circuit for said electroresponsive means with said trigger contact means and the remote switching position of the first local-remote switch and having a second contact means connecting said trigger means to the control power leads,
(h) an indicating means connected between said control-signal lead and a control lead in parallel with said electroresponsive means and energized by the voltage developed across said trigger means in the remote switching position of the second local-remote switch,
(i) a separate energizing source for said indicating means and having an output different than the voltage developed across the trigger means and connected to said control-signal lead by the local switching position of the second local-remote switch, and
(j) means for varying the output of the separate energizing source in accordance with the energization of said electrically actuated means.

15. A remote and local control system for an electrically operated device having normally open power contacts in the main power lines to the device, (a) electroresponsive means for closing said contacts,
(b) a local switching center having a normally open start switch and a normal closed stop switch,
(c) a first local-remote switch having a local switching position and a remote switching position, said local-remote switch in said local switching position being connected in a series energizing circuit for said electroresponsive means with said start switch and stop switch to the main power lines of the local switching center,
(d) a set of normally open latching contacts connected in parallel with said start switch and coupled to said electroresponsive means,
(e) a remote switching center having a pair of control power leads connected to a source of incoming power and a control-signal lead connected to one of said power leads by a normally open start switch and a set of normally closed contacts of a stop switch, said stop switch including a set of normally open contacts connecting said control-signal line to the other of said power leads,
(f) a neon signal lamp connected at one end between said start switch and stop switch and at the opposite end to a control power lead,
(g) a trigger relay including a trigger winding having one side connected to the power lead connected to the open contacts on the stop switch and having a set of contacts connected in a series circuit with the remote switching position of said local-remote switch,
(h) a second local-remote switch having a remote switching position connecting the opposite side of said trigger winding to said control-signal line and having a local switching position,
(i) an interlock relay having an interlock winding connected to the main power lines for energization in response to the closing of the power contacts and having a first set of normally closed contacts connected in a series energizing circuit for said electroresponsive means with said trigger relay contacts and the remote switching position of the first local-remote switch and the normally closed stop switch of the local swiching center and having a second set of normally open contacts connected in series with said relay winding to the control power leads and having a third set of contacts, and (j) a relaxation oscillator circuit connected to said control power leads in series with said control-signal lead by the local switch position of said second local-remote switch, said oscillator circuit having a circuit element partially determining the oscillation period and being connected across said third set of contacts of said interlock relay.

16. The construction of claim 15 wherein said oscillator circuit includes, (a) an output capacitor of sufficient magnitude to establish the circuit operation essentially independent of lead capacitance associated with said control-signal lead.

17. A remote control system for electrically operated equipment, which comprises, (a) main relay means having contacts connected in the power input circuit of said equipment and having a set of normally open latching contacts, (b) a remote trigger relay having a set of normally open contacts connected in a series circuit with said latching contacts and said main relay means, (c) a remote control center having a control lead connected to said trigger relay for momentarily energizing said trigger relay, (d) an interlock relay connected to be energized in synchronism with said main relay means and having a set of normally closed contacts and having a set or normally open contacts for connecting said trigger relay to a control power lead, and (e) means connecting said normally open contacts of the trigger relay and the normally closed contacts of said interlock relay in circuit with said main relay means for energizing the main relay whereby automatic restarting of the equipment after failure and return of control power or main power is prevented.

18. A remote control system of claim 17 having, (a) a local control center in proximity to the equipment and having means to operate said equipment, (b) a signal source having a plurality of output characteristics, (c) switch means for connecting said signal source to said control lead from the remote control center, and (d) a third set of contacts of said interlock relay being connected to said signal source to adjust the output characteristic of the source in response to energization of the interlock relay.

19. A remote control system having a control power source for connecting an electrically responsive device to a separate main power source which comprises, (a) a trigger means having control contacts, (b) means to momentarily connect the trigger means to the source of control power, (c) an electro-responsive means connected in a first circuit means dependently including said control contacts for connecting said device to the main power source and establishing a second circuit means dependently including said control contacts for connecting said device to the main power source, (d) interlock means responsive to continued connection of the device to the main power source and including first contacts in said circuit means to open said circuit means, and (e) said interlock means including second contacts and responsive to said continued connection of the device to the main power source to hold said trigger means connected to the control power source and to thereby hold the control contacts in the actuated position.

References Cited by the Examiner

UNITED STATES PATENTS

| | | | |
|---|---|---|---|
| 1,557,065 | 10/1925 | King | 318—547 X |
| 2,254,285 | 9/1941 | Harris et al. | |
| 2,307,315 | 1/1943 | Wolfe | 317—157 X |
| 2,372,061 | 3/1945 | Derr | 317—157 X |
| 2,939,054 | 5/1960 | Cawso et al. | 317—157 |
| 2,994,860 | 8/1961 | Weld | 317—157 X |
| 3,039,029 | 6/1962 | Spafford | 318—17 |

ORIS L. RADER, *Primary Examiner.*